(12) United States Patent
Mann

(10) Patent No.: US 6,833,218 B2
(45) Date of Patent: Dec. 21, 2004

(54) DIRECT CAST LEAD ALLOY STRIP FOR EXPANDED METAL BATTERY PLATE GRIDS

(75) Inventor: Gamdur Singh Mann, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 309 days.

(21) Appl. No.: 10/226,749

(22) Filed: Aug. 23, 2002

(65) Prior Publication Data

US 2004/0038129 A1 Feb. 26, 2004

(51) Int. Cl.$^7$ .......................... H01M 4/68; H01M 4/73; B23P 13/00
(52) U.S. Cl. .......................... 429/245; 29/2; 429/233; 429/243
(58) Field of Search .......................... 429/233, 241, 429/243–245; 29/2; 83/903

(56) References Cited

U.S. PATENT DOCUMENTS

| | | | |
|---|---|---|---|
| 3,945,097 A | 3/1976 | Daniels, Jr. et al. | 29/12 |
| 3,947,936 A | 4/1976 | Wheadon | 29/12 |
| 4,050,502 A | 9/1977 | Allyn et al. | 164/68 |
| 4,305,187 A | 12/1981 | Iwamura et al. | 29/12 |
| 4,317,351 A * | 3/1982 | Borrows | 72/186 |
| 4,351,891 A * | 9/1982 | McCartney et al. | 429/225 |
| 4,443,918 A | 4/1984 | Morinari et al. | 29/13 |
| 5,434,025 A | 7/1995 | Rao et al. | 429/245 |
| 5,462,109 A | 10/1995 | Vincze et al. | 164/479 |
| 5,580,685 A | 12/1996 | Schenk | 429/234 |
| 5,611,128 A | 3/1997 | Wirtz | 29/12 |
| 5,691,087 A | 11/1997 | Rao et al. | 429/245 |
| 5,874,186 A | 2/1999 | Rao et al. | 429/242 |
| 5,948,566 A | 9/1999 | Larsen et al. | 429/225 |
| 6,180,286 B1 | 1/2001 | Rao et al. | 429/245 |
| 6,291,097 B1 | 9/2001 | Barker et al. | |
| 6,419,712 B1 | 7/2002 | Haverstick | |
| 6,444,366 B1 * | 9/2002 | Kawano et al. | 429/241 |
| 6,454,977 B1 | 9/2002 | Kwok et al. | |
| 6,468,318 B1 | 10/2002 | Meadows et al. | |
| 6,582,855 B1 * | 6/2003 | Miyamoto et al. | 429/235 |
| 2003/0059674 A1 * | 3/2003 | Mann et al. | 429/128 |

* cited by examiner

*Primary Examiner*—Patrick Ryan
*Assistant Examiner*—Tracy Dove
(74) *Attorney, Agent, or Firm*—Jimmy L. Funke

(57) ABSTRACT

A method of making a lead alloy grid for use in a plate for a lead acid battery that enables thin battery plates with a high surface area. The method of the present invention includes forming the lead alloy, such as by direct casting, to a very small thickness, then work hardening the cast strip to create a grid by forming indentations and protrusions in the thinly cast alloy strip, which in addition to strengthening the strip, provides a desirable surface topography for paste adhesion and interface characteristics. The work hardening, for example embossing, may further include splitting the strip at a high point of the protrusions and indentations to create perforated protrusions and indentations. The grid may then be used to make a plate by pasting an active mass onto the grid, steaming the pasted grid, and curing the pasted grid to provide a plate having a thickness of about 0.05 inch or less. There is further provided a lead alloy grid for use in a plate of a lead acid battery, the grid comprising a cast lead-tin-calcium alloy having spaced protrusions and indentations on each opposing surface of the grid. The protrusions and indentations may further include a perforation. The grid has a higher surface area than punched or expanded grids, thereby providing a lower resistance and better adherence at the paste/grid interface.

37 Claims, 11 Drawing Sheets

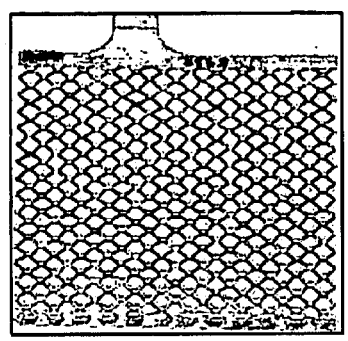
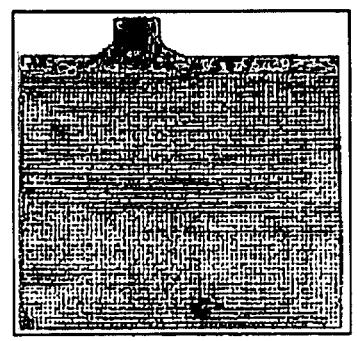
FIG. 5A
PRIOR ART
FIG. 5B
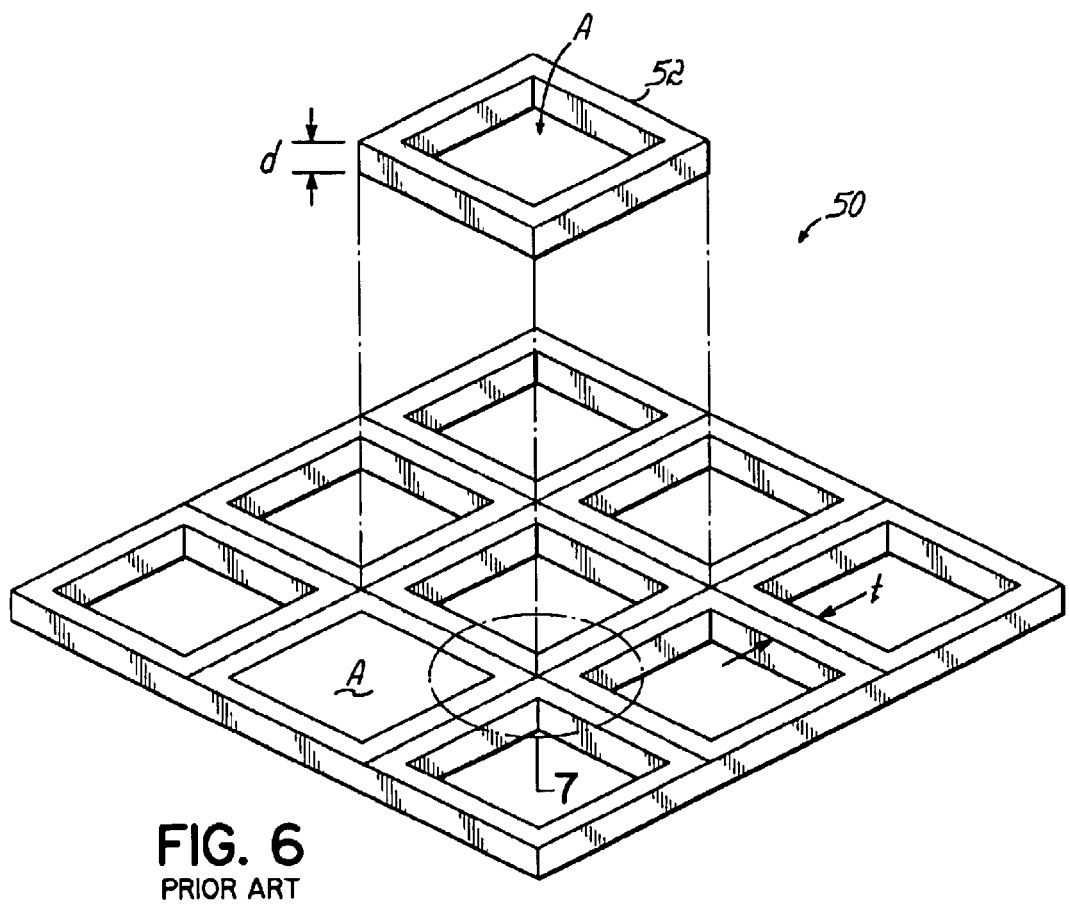
FIG. 6
PRIOR ART

DIRECT CAST LEAD ALLOY STRIP FOR EXPANDED METAL BATTERY PLATE GRIDS

TECHNICAL FIELD

This invention relates to a method for making lead alloy grids for the positive and negative plates of lead acid batteries.

BACKGROUND OF THE INVENTION

Lead acid batteries are widely used in the automotive industry. The basic lead acid battery cell includes a positive plate, a negative plate, and a sulfuric acid electrolyte. The plates are held parallel and are electrically isolated by a separator. The separator is microporous and allows free movement of charges and ions through it. The space between the plates is filled with the sulfuric acid electrolyte.

The positive plate is made by applying and curing a positive paste to a lead alloy grid. The cured plate contains sulfates, hydroxides, free lead, carbonates and other complex compounds of lead. This complex paste structure is then converted to sulfates by adding acid, a process commonly referred to as "pickling." The pickled plates are then formed, i.e. charged for the first time, by passing electric charge through the cell. This charge is supplied from an external source. The charging reaction is as follows:

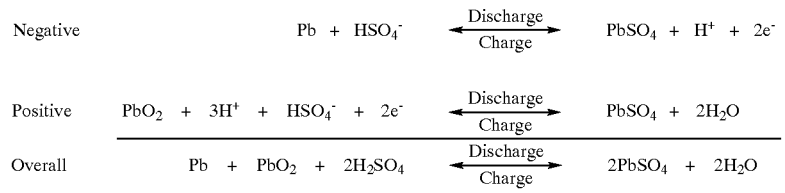

The complex sulfates are converted to lead dioxide, which becomes the positive active mass. When the cell is discharged, the lead dioxide changes to lead sulfate. As the cell is recharged, lead sulfate changes back to lead dioxide, and this process keeps repeating. This cyclic process eventually results in the degradation of the structure of the positive active mass. At that point, the battery cell loses its capacity such that it is no longer useful.

The negative plate construction is similar to that of the positive plate. The negative paste has similar ingredients to the positive paste, but includes an additional material referred to as an expander. The expander provides conditions during forming that result in the formation of a high surface area lead "spongy" active mass at the negative collector surface. The negative cure paste starts out as sulfates, etc., and during forming changes to lead structures. The negative active mass thus cycles between lead and lead sulfate.

The lead acid cell system is unique because the electrolyte reacts or participates actively in the energy storage and release process. The function of electrolyte in other systems is generally to conduct charges only. A fully charged lead acid battery cell develops about 2.5 volts. Batteries based on repeated use of active materials are referred to as secondary storage batteries.

Lead acid batteries that require little to no further maintenance throughout the expected life of the battery are of most interest to the automotive industry. This type of battery is typically referred to as a maintenance-free battery. Originally, pure lead was used for making lead acid secondary storage batteries. The pure lead acted both as a current collector and active material. The energy storage quantities, however, were small. As the demand for high energy and power increased, active materials in the form of pastes and grids as collectors were developed. The function of the grid is to collect electric charge and conduct it to the terminal, as well as to provide mechanical support for the active material. The grid material should have high electrical conductivity, good mechanical strength, good resistance to corrosion in sulfuric acid, and good processability.

A considerable amount of effort has been devoted to the type of alloys used for manufacturing positive and negative grids for such maintenance-free, secondary storage batteries. Pure lead met most of the requirements for the grids except mechanical strength. Lead is soft and difficult to process. In the past, the only way pure lead could be hardened or strengthened was by cold working. However, cold working does not produce acceptable mechanical properties. Adding alloying elements to pure lead, and then cold working, hardened the lead and produced desirable mechanical properties. However, electrical conductivity was adversely affected by the alloy additions. Lead based grids were first made by casting techniques using gravity feed and book moulds. Antimony was added to lead to improve its castability. While the antimony addition provided mechanical strength for the lead alloy, it had a negative effect on the life of the battery due to a loss of water and increased self-discharge.

Expanded metal grid technology was next developed, which was less expensive than the cast grids. By this technique, a rolled or wrought alloy strip or a cast strip is slit and expanded using reciprocating dies or the like and then cut into the desired width and height dimension to form the grid. For this process, calcium addition replaced the antimony addition. A continuous cast grid process was also developed using a lead-tin-calcium alloy, which offered improved properties over the lead-antimony cast grids, but was still more expensive as compared to expanded grid processes. Various battery manufacturers currently use all of these processes.

After the grids are fabricated, the active paste is applied to the grids, generally in a continuous process. Thin and perforated paper is then applied on both sides of the plates and the plates are flash dried, which helps in handling so that the plates do not stick together. The pasted grids are heated in a steamer, typically for about 3–4 hours at about 99° C. (210° F.). Finally, the pasted grids are cured in a process that takes about 3–4 days at a curing temperature of approximately 49° C. (120° F.). It is during the curing process that the interface between the grid material and the active mass paste develops. The interface layer is essentially a lead oxide layer resulting from corrosion of the grid material. The presence of water is essential for this reaction to proceed. At the end of the curing process, the interface layer is very thin.

The cured plates are assembled into the battery. Each automotive battery consists of six separate cells, each contributing about 2–2.5 volts, and the cells are connected in series inside the battery package. Once the plates are incorporated into the package, sulfuric acid is added to the cells, and the cells are allowed to stand for about an hour for the pickling to occur. The battery is then charged for the first time, referred to as forming. After forming, the acid is removed and fresh acid is added and the battery is sealed.

In use, the interface layer grows during each charging process. Because the battery is discharged and charged repeatedly during use, this interface layer continues to grow thicker over time. Eventually, the interface layer can become thick enough to result in failure of the battery. Due to an increase in under-the-hood temperatures in most automobile applications, however, corrosion at the paste-grid interface has become a greater concern. Batteries are tested for corrosion resistance using the industry-accepted SAE J240 life test, which is conducted at 75° C. (167° F.). As the temperature increases, the corrosion rate increases even faster, i.e., the rate of reaction is an exponential function of temperature. Consequently, the interface between the active mass (paste) and the collector (grid) corrodes to form and grow the lead oxide layer at a high rate at elevated temperature. This lead oxide layer introduces resistance to the flow of electricity. Resistance is proportional to the thickness of the lead oxide layer and inversely proportional to the surface area of the grid. Thus, as the lead oxide layer thickens, the resistance increases. In some instances, separation occurs between the collector and the active mass, resulting in a loss of electrical contact therebetween, which degrades the battery operation.

By way of further explanation, it is known that the interface layer consists primarily of lead dioxide, which conducts electrons and oxygen ions. The oxygen ions diffuse from the paste side through the interface layer to the grid surface and react with lead. Thus, the interface layer grows in thickness. The volume of oxide formed is roughly 1.4 times larger than the metal volume. In addition to increasing resistance to the flow of electricity, this introduces stresses in the oxide. Depending upon the shape of the underlying metal surface, i.e. convex, flat or concave, the stress state is either tensile or compressive. The lead oxide is a ceramic material, which is very weak in tension as compared to compression. Hence, if the surface is convex, the oxide outer surface is in tension. As the thickness grows, so does this tensile force, eventually resulting in the fracture of this oxide in the direction normal to the metal surface. This condition is acceptable as long as the remaining oxide stays in contact with the metal, such that electrical contact between the grid and the active mass is not totally destroyed. Alternatively, the oxide lifts up from the grid surface due to compressive forces. A complete separation of the active mass from the collector surface (grid) results in a loss of electrical contact, and consequently battery failure. Where the active paste and the interface layer are thin, a flat underlying metal surface works reasonably well. However, this construction suffers disadvantages such as a lack of battery capacity and a higher rate of self-discharge. It is appreciated by those skilled in the materials field that sharp corners, edges, high stress fields, and local chemical differences result in increased corrosion rates, but these conditions cannot always be avoided. Hence, one objective for design and material selection is minimization of corrosion, given that complete elimination is not possible. If corrosion is minimized, i.e., the rate of growth of the oxide layer is decreased, then a lower resistance is maintained for a longer period, and stress-induced failure is delayed.

Numerous research efforts have focused on modifying the alloy composition to remedy the corrosion occurring at the interface between the active mass and the grid. For example, silver additions have been made to reduce corrosion. However, silver additions introduce disadvantages, such as reduced adhesion of the paste to the grid. After years of development focusing upon alloy compositions, the Pb-1.5Sn-0.08Ca alloy composition has become the most widely used composition for lead acid secondary storage batteries, and is considered to be adequate for almost all applications. Corrosion properties, however, are determined both by the chemistry and the processing of the grid material. Despite the efforts that have been made with respect to the material selection, the processing as it affects the interface layer has received little attention. Thus, the method of making the grid also represents a potential research area for reducing corrosion.

Grids have been fabricated by gravity feed book mould processing, by continuous casting using a drum, by the expanded metal technique, and by punching. Gravity feed book mould casting and continuous drum casting use molten metal to make the final grid shape. No mechanical fabrication is used to make or shape the grid. Both the expanded metal technique and punching use a strip of lead alloy metal and either cut and expand the strip or punch the grid from the strip. Punching uses a die to cut a desired shape out of the lead alloy strip and the punched material is physically removed from the strip and then recycled. Because resistance is inversely proportional to the surface area of the grid, less grid material translates to lower surface area and thus higher resistance. The expansion method uses partial cuts, and then stretches the strip normal to the cuts. Thus, no material is physically removed in the expansion method, which is advantageous, but the tools and machinery used for expanding are expensive and intricate, and the structure has large and numerous open areas. The strip used for the expansion method or the punching method may be produced either by conventional rolling techniques or could be cast directly to the desired thickness from molten metal.

Due to the softness of the lead strip, the strip and grid are difficult to handle during grid making and pasting. The minimum thickness to which the strip is cast has been no less than about 0.03 inch and the minimum practical plate thickness with the cured paste and expanded metal grid has been no less than about 0.065 inch. Also, for a given battery capacity, the number of plates per unit volume is limited. Currently, SLI 12V lead acid batteries contain 6 cells connected in series, with each cell consisting of multiple positive and negative plates connected in parallel. However, higher power and voltage batteries require more collector surface area and a greater number of cells, such that there is a need for thinner plates and a method of manufacturing thinner plates, which can be practically implemented. There is further a need for a manufacturing technique for making lead acid battery plate grids that minimizes the effects of corrosion at the interface between the paste and the grid.

SUMMARY OF THE INVENTION

The present invention provides a method of making a lead alloy grid for use in a plate for a lead acid battery that enables thin battery plates with a high surface area for minimizing the effects of corrosion. The method of the present invention permits the lead alloy to be formed to a very small thickness while work hardening strengthens the strip for handling by cold working and stress distribution. The work hardening is achieved by creating indentations and protrusions in the thinly cast alloy strip, which in addition to strengthening the strip, provides a desirable surface topography for paste adhesion and interface characteristics. To this end, a lead-tin-calcium alloy, for example Pb-1.5Sn-0.08Ca, is formed such as by direct casting to a thin strip, for example having a thickness in the range of about 0.005–0.015 inch, then the strip is work hardened by forming a plurality of indentations in a surface of the strip. In an exemplary embodiment of the present invention, opposing surfaces of a directly cast strip are embossed to form a pattern on each surface of protrusions and indentations. The work hardening, for example embossing, may further include splitting the strip at a high point of the protrusions and indentations to create perforated protrusions and indentations. The grid may then be used to make a plate by pasting an active mass onto the grid, steaming the pasted grid, and curing the pasted grid to provide a plate having a thickness of about 0.05 inch or less.

The present invention further provides a lead alloy grid for use in a plate of a lead acid battery, the grid comprising a cast lead-tin-calcium alloy having spaced protrusions and indentations on each opposing surfaces of the grid. The protrusions and indentations may be pyramid-shaped, cone-shaped or hemispherical-shaped, for example. The protrusions and indentations may further include a perforation. The grid has a higher surface area than punched or expanded grids, thereby providing a lower resistance.

BRIEF DESCRIPTION OF THE DRAWINGS

The present invention will now be described, by way of example, with reference to the accompanying drawings, in which:

FIG. 5A is a photograph of an expanded grid in accordance with the prior art;

FIG. 5B is a photograph of a perforated grid in accordance with the present invention;

FIG. 6 is an exploded perspective view of an expanded lead alloy grid of the prior art;

DETAILED DESCRIPTION

The present invention provides a lead alloy grid, and a plate for use in a lead acid battery which incorporates the grid, in which there is provided a thinner grid having at least about 1.5 times greater surface area of the paste-grid interface compared to expanded grids, and a stress field configuration that strengthens the material and minimizes the effects of corrosion. In accordance with the inverse relationship, the increase in surface area by 1.5 results in a ⅓ decrease in resistance to the flow of electricity, assuming a constant thickness for the oxide layer. Active mass per unit area of the collector surface (grid) is an important parameter that determines utilization, efficiency and high-rate performance. The battery package design determines the battery capacity. The object in forming batteries is to have sufficient capacity, high mass utilization, and good high-rate performance. To achieve this, it is desirable to pack as much energy and power as possible into the smallest possible space, and in the lightest possible package to result in an acceptable battery life, particularly at high operating temperatures. Thus, it is an object to make thin battery plates that resist corrosion. These thin plates must then be incorporated into a package design that provides the needed capacity and heat removal characteristics for proper operation, performance and battery life. However, the difficulty with making thin battery plates is that thin lead alloy stock is difficult to handle, i.e. it is too soft. The present invention provides a method of making thin plate grids where the alloy stock can be handled satisfactorily. An exemplary method of the present invention includes direct casting of lead alloy strip. Specifically, a lead-tin-calcium alloy is directly cast to a strip of about 0.005–0.015 inch thickness, for example to about 0.01 inch thickness. If rolling is desired, the cast strip may be rolled directly after the casting step, but rolling is not required in the method of the present invention. The cast strip is then work hardened, such as by embossing or knurling to form a desirable pattern in the strip that gives a desirable surface topography for paste adhesion and strengthens the strip for handling by cold working and stress distribution. The embossing or knurling process creates impressions or indentations in the material. The impressions may further include a perforation within the impression. When each of opposing surfaces of the strip are work hardened to create impressions, then each surface will appear to have both indentations and protrusions, as will be discussed in more detail below.

Figure 1A:
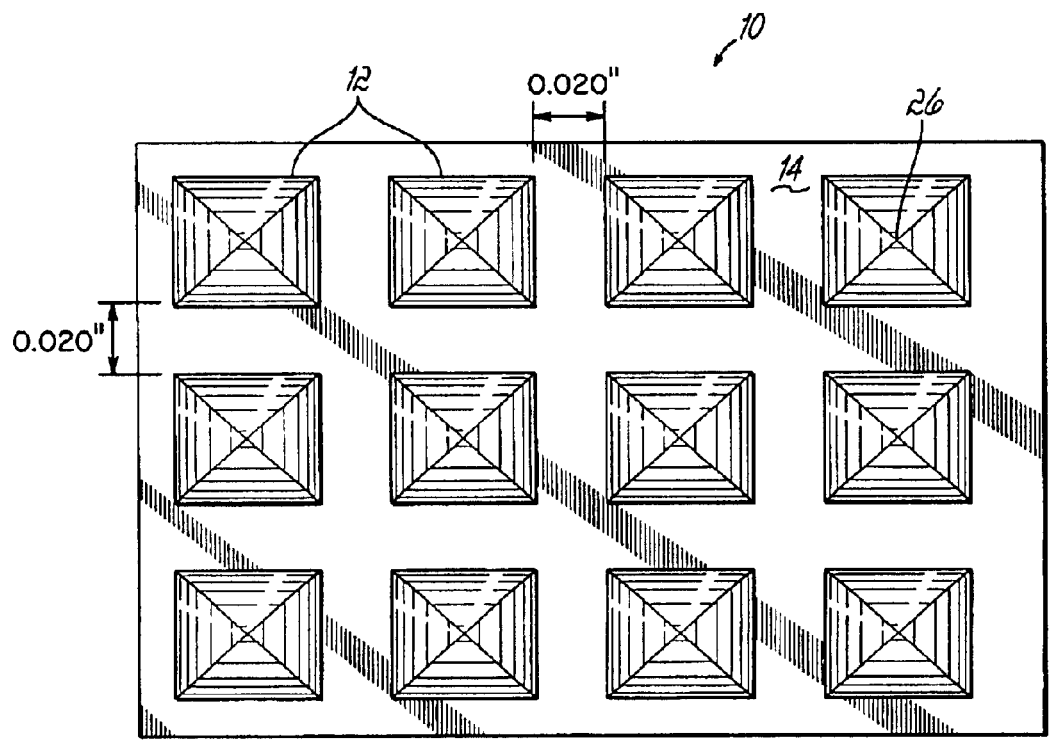
FIG. 1A is a top view of a cast lead alloy grid in accordance with an embodiment of the present invention having pyramid-shaped protrusions extending upwardly from the surface.
Figure 1B:
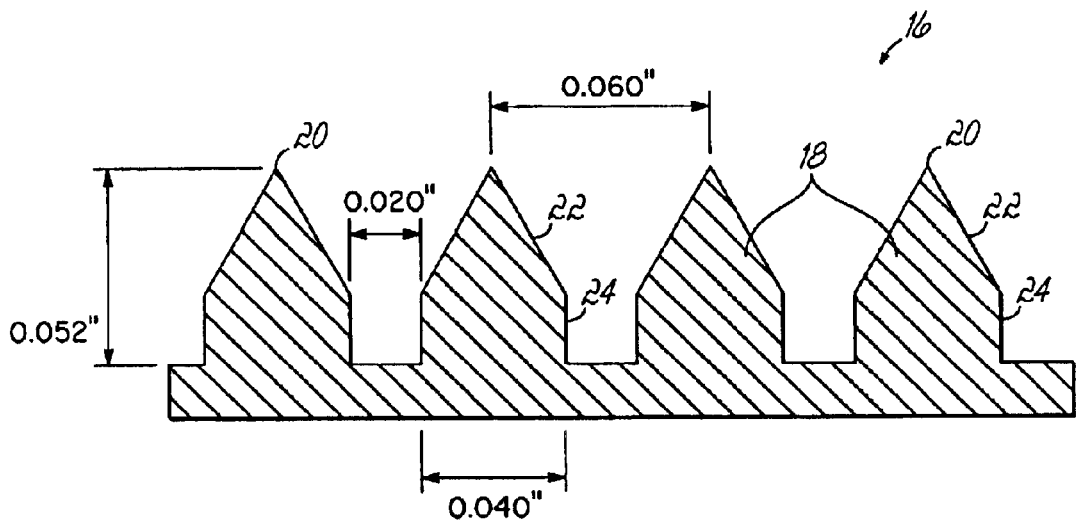
FIG. 1B is a schematic view of a tool configuration for forming the protrusions in the grid of FIG. 1A.

The invention will now be described with reference to the figures, in which like numerals are used to refer to like features. FIG. 1A is a top view of a lead alloy grid 10 having a plurality of protrusions 12 extending upwardly from the surface 14. If the grid 10 were viewed from the opposing surface (not shown), the grid 10 would appear to have a plurality of indentations extending into the surface. To produce the grid 10, a cast strip may be work hardened by embossing using a tool 16 shown schematically in FIG. 1B. The tool includes a plurality of pyramid-shaped tips 18 for forming the protrusions 12. By way of example, the cast strip is first made by drum casting the lead alloy to the required thickness, which is advantageously in the range of 0.005–0.015 inch, for example 0.01 inch, by pouring the molten lead alloy over a rotating drum (not shown) which is water cooled. The solid strip is peeled off the drum surface and passed through a small rolling mill (not shown) in which the tool 16 shown in FIG. 1B forms the surface of a driven roller, and the opposing surface of the cast strip is supported on a hard rubber piece. By way of example, the pyramid-shaped tips 18 for the tool 16 may be spaced about 0.01–0.03 inches apart, for example 0.02 inch as shown, to create a grid pattern having about 0.01–0.03 inch between spaced apart protrusions 12. The tips 18 of the embossing tool 16 include a high point 20 and pyramid-shaped angled surfaces 22 with a base portion 24 having a dimension of 0.04×0.04 square inches, for example, for a total indentation or protrusion depth of 0.052 inch, for example. It may be appreciated, however, that the values given are merely exemplary and the invention should not be so limited. The high point 20 of the tip 18 may also serve to pierce the cast strip to create a perforation (not shown) at the high point 26 of the protrusion 12. When active paste is applied to the grid 10, perforations within the protrusions 12 may aid in adherence of the paste to the grid 10, as well as increasing the surface area of the grid 10.

Figure 2A:
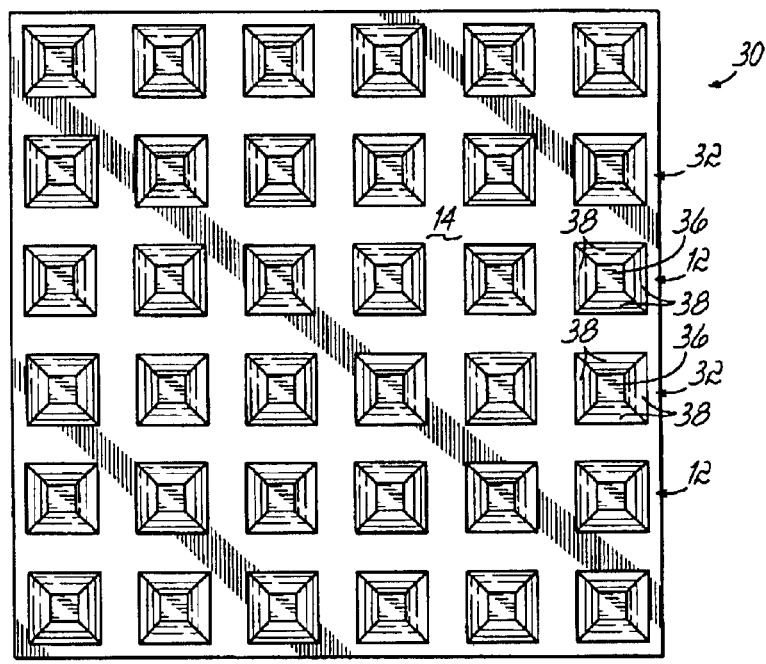
FIGS. 2A–2B are top and side views, respectively, of a cast lead alloy grid in accordance with another embodiment of the present invention, embossed on each of opposing sides to create square-tipped pyramid-shaped protrusions and indentations.
Figure 2B:
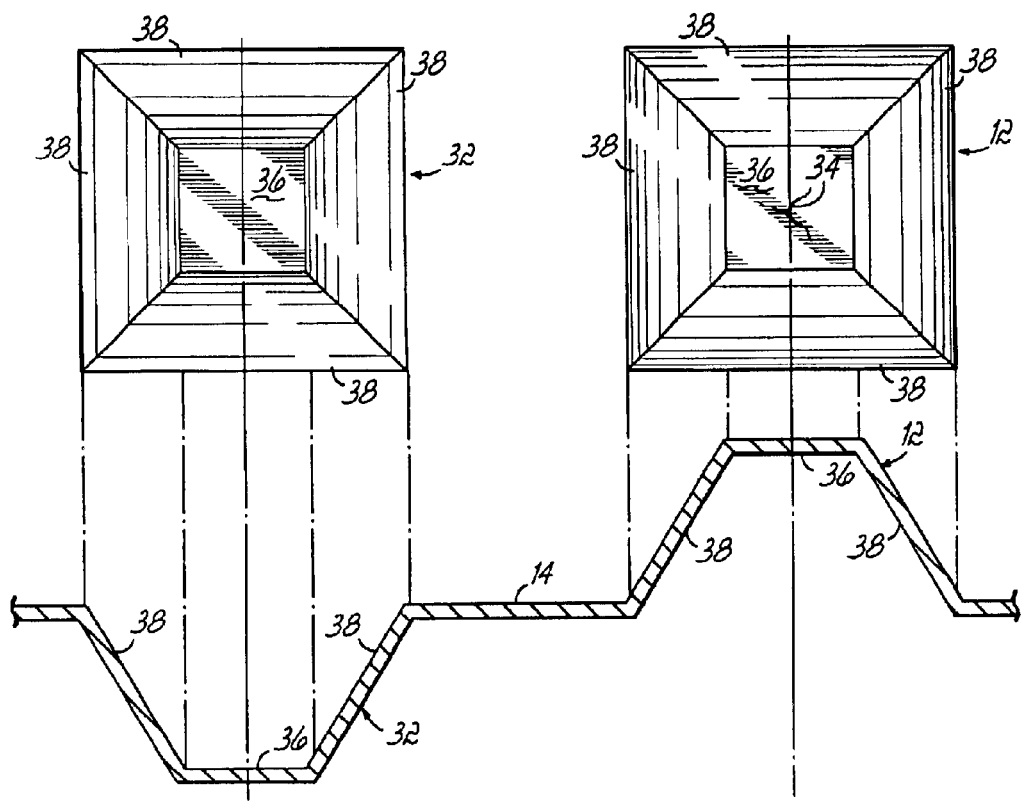

In other embodiments of the present invention, grids 30 having a pattern of alternating protrusions 12 and indentations 32 are formed, as shown in FIGS. 2A, 2B, 3, 4A and 4B. The protrusions 12 and indentations 32 are formed by a patterned design incorporated into the surface of a roller (not shown), which can be used in conjunction with the casting as a continuous process, or in a separate process. By way of example, the design of the rolls may be two solid patterned surfaces, such that both opposing surfaces are embossed together, or one solid pattern surface and a second rubber lined roller surface, such that the opposing surfaces are embossed sequentially. The tooling pattern used to create the embossed strip (grid) 30 depicted in FIGS. 2A and 2B is a square-tipped pyramid-shaped pattern to create alternating regions that are pushed up (protrusions 12) and pushed down (indentations 32). No punching through occurs, and thus no material is removed from the strip 30. For perforated embodiments, as shown in FIG. 2B, the strip material splits to form a perforation 34 at the high points 36, which in that embodiment is a central square area formed by the square tip of the tooling pattern. It may be appreciated that splitting will occur in the thin strip if the impression is formed to a sufficient depth. The central square area 36 is surrounded by four angled surfaces 38 that extend to surface 14 of the grid 30. FIG. 2B shows a protrusion 12 and an indentation 32 with a side cross-sectional view that further depicts protrusion 12 extending upwardly from surface 14 with four angled surfaces 38 leading to central square area 36, which is the high point of the protrusion 12, and similarly, indentation 32 extending downwardly from surface 14 with four angled surfaces 38 leading to central square area 36, which is the high (low) point of the indentation.

Figure 3:
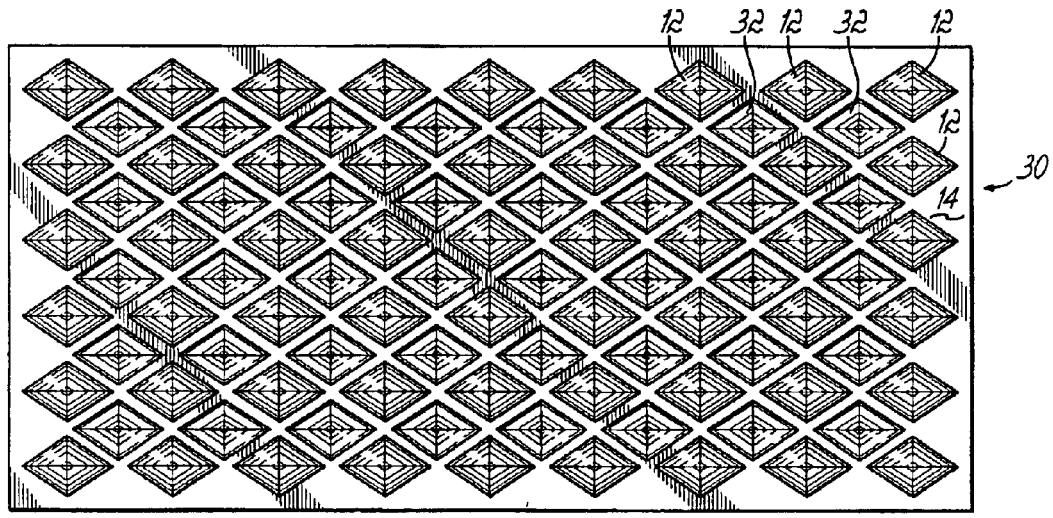
FIG. 3 is a top view of a cast lead alloy grid in accordance with another embodiment of the present invention, embossed on each of opposing sides to create diamond-shaped protrusions and indentations.
Figure 4A:
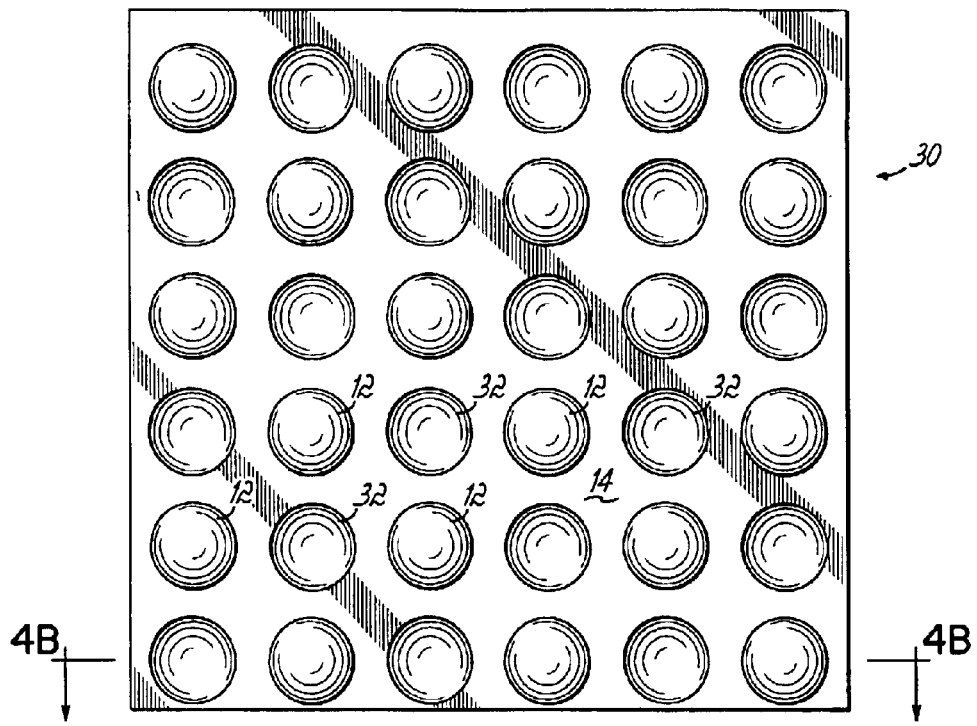
FIGS. 4A–4B are top and side views, respectively, of a cast lead alloy grid in accordance with another embodiment of the present invention, embossed on each of opposing sides to create hemispherical-shaped protrusions and indentations.
Figure 4B:
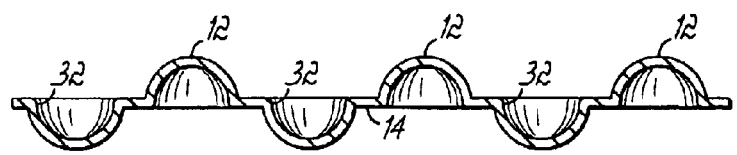

FIG. 3 depicts yet another embodiment of a grid 30 work hardened using a diamond-shaped tooling pattern to create rows of pushed up areas (protrusions 12) alternating and offset with rows of pushed down areas (indentations 32). The embodiment of a grid 30 depicted in FIGS. 4A and 4B includes alternating hemispherical-shaped protrusions 12 and indentations 32. FIG. 4B is a side cross-sectional view depicting further the protrusions 12 extending upwardly from surface 14 and alternating with indentations 32 extending downwardly from the surface 14. While various shapes have been described for the impressions, it may be appreciated that the invention is not so limited. For example, the impressions may be cone-shaped, square-shaped, triangular-shaped, oval-shaped, etc.

FIG. 5A is a photograph of an expanded grid in accordance with the prior art. FIG. 5B is a photograph of an embossed and perforated grid in accordance with the present invention. Table 1 provides typical parameters for the expanded grid of FIG. 5A versus the embossed and perforated grid of FIG. 5B, and for positive plates made by applying a positive active mass paste to the grids.

TABLE 1

Expanded Grid vs. Perforated Grid
Typical Parameters

| Grid<br>Plate | Expanded<br>(+) | Perforated<br>(+) |
| --- | --- | --- |
| Height (inch) | 4.870 | 4.830 |
| Width (inch) | 5.440 | 5.440 |
| Approx. Grid Wt. (g) | 56 | 56 |
| Strip Thickness (inch) | 0.042 | 0.010 |
| Approximate Dry Paste (g) | 90 | 90 |
| Plate (Pasted Grid) Thickness (inch) | 0.075 | 0.040 |
| Alloy (bal. Pb, wt %.) | 1.5 Sn-0.08 Ca | 1.5 Sn-0.08 Ca |
| Paste (% $SO_4$) | 12 | 12 |
| Grid Surface Area/Interface (sq. inch) | ~16 | >24 |
| Grid Physical Area/Interface (sq. inch) | 24 | 24 |

For an expanded grid and an embossed and perforated grid of approximately the same height, width and grid weight, as well as the same amount of dry active material paste, the expanded grid of the prior art has a strip thickness of 0.042 inch and a pasted thickness of 0.075 inch, whereas the embossed and perforated grid of the present invention has a strip thickness of 0.010 inch and a pasted thickness of 0.040 inch. Thus, by virtue of the method of the present invention, the embossed and perforated grid of the present invention can be made significantly thinner than an expanded grid of the prior art. Additionally, for the same grid physical area/interface of 24 sq. inches, the perforated grid of the present invention has greater than 24 sq. inches of grid surface area/interface compared to only 16 sq. inches for the expanded grid of the prior art. Thus, the perforated grid of the present invention provides the same amount (weight) of lead for current collecting as the expanded metal grids of the prior art, but gives about 1.5 times the surface area at the paste-grid interface, which is important for lowering the ohmic drop, particularly in aged batteries.

To further explain the surface area of the paste-grid interface for the present invention versus the expanded metal grid of the prior art, FIG. 6 depicts in exploded perspective view the expanded metal grid 50 of the prior art. The expanded grid structure, formed by creating slits in a cast and rolled strip, then expanding the metal to create a diamond grid pattern, includes a wall thickness t of about 0.8 mm with a depth d of 0.7 mm. Each diamond 52 has an open area A of about 13.74 sq. mm, with the expanded grid having a total open area of about 62.6%. Table 2 further provides the diamond parameters calculated for the expanded metal grid of the prior art depicted in FIG. 6.

TABLE 2

Expanded Metal Grid Diamond
Calculated Parameters

| | |
| --- | --- |
| Depth, mm (inch) | 0.7 (0.0276) |
| Wire Width, mm (inch) | 0.8 (0.0315) |
| Inside Major Diagonal, mm (inch) | 8.46 (0.333) |
| Inside Minor Diagonal, mm (inch) | 3.25 (0.128) |
| Inside Included Angle (degree) | 42 |
| Open Area/Diamond, sq. mm (sq. inches) | 13.74 (0.0213) |
| Physical Area/Diamond, sq. mm = 21.94 × 2 (sq. inches) | 43.88 (0.068) |
| Surface Area/Diamond, sq. mm (sq. inches) | 29.1 (0.045) |
| Open Area (%) = (13.74/21.94) | 62.6 |
| Ratio (Surface/Physical) Area | 0.663 |

Figure 7A:
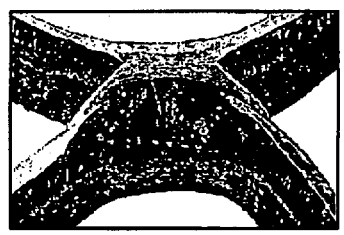
FIGS. 7A–7D are SEM photographs of an expanded lead alloy grid taken from a portion of a grid analogous to circled area 7 of FIG. 6.
Figure 7B:
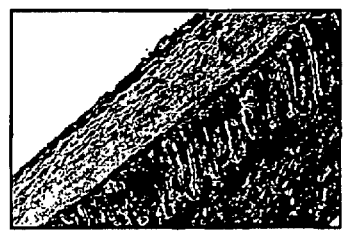
Figure 7C:
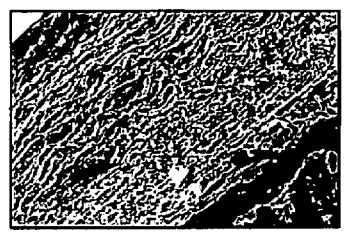
Figure 7D:
Figure 8A:
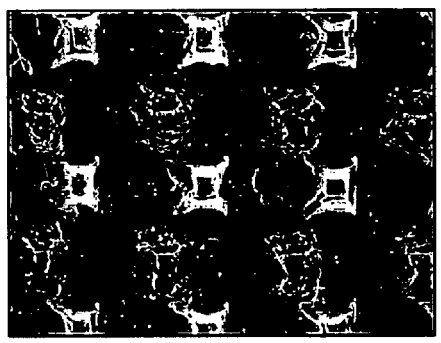
FIGS. 8A–8D are SEM photographs of a perforated cast lead alloy grid of the present invention.
Figure 8B:
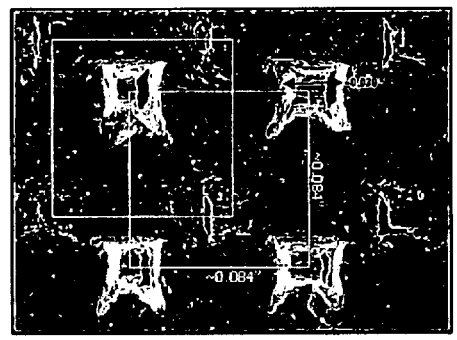
Figure 8C:
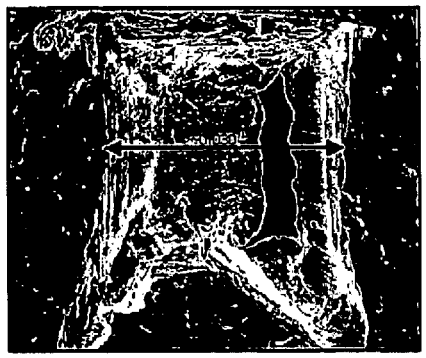
Figure 8D:
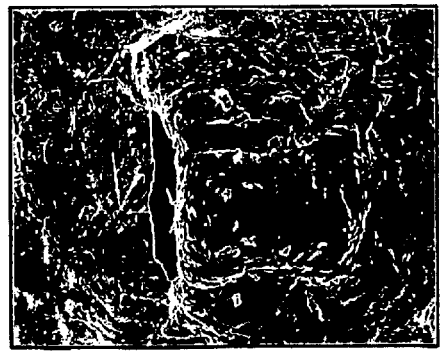
Figure 9:
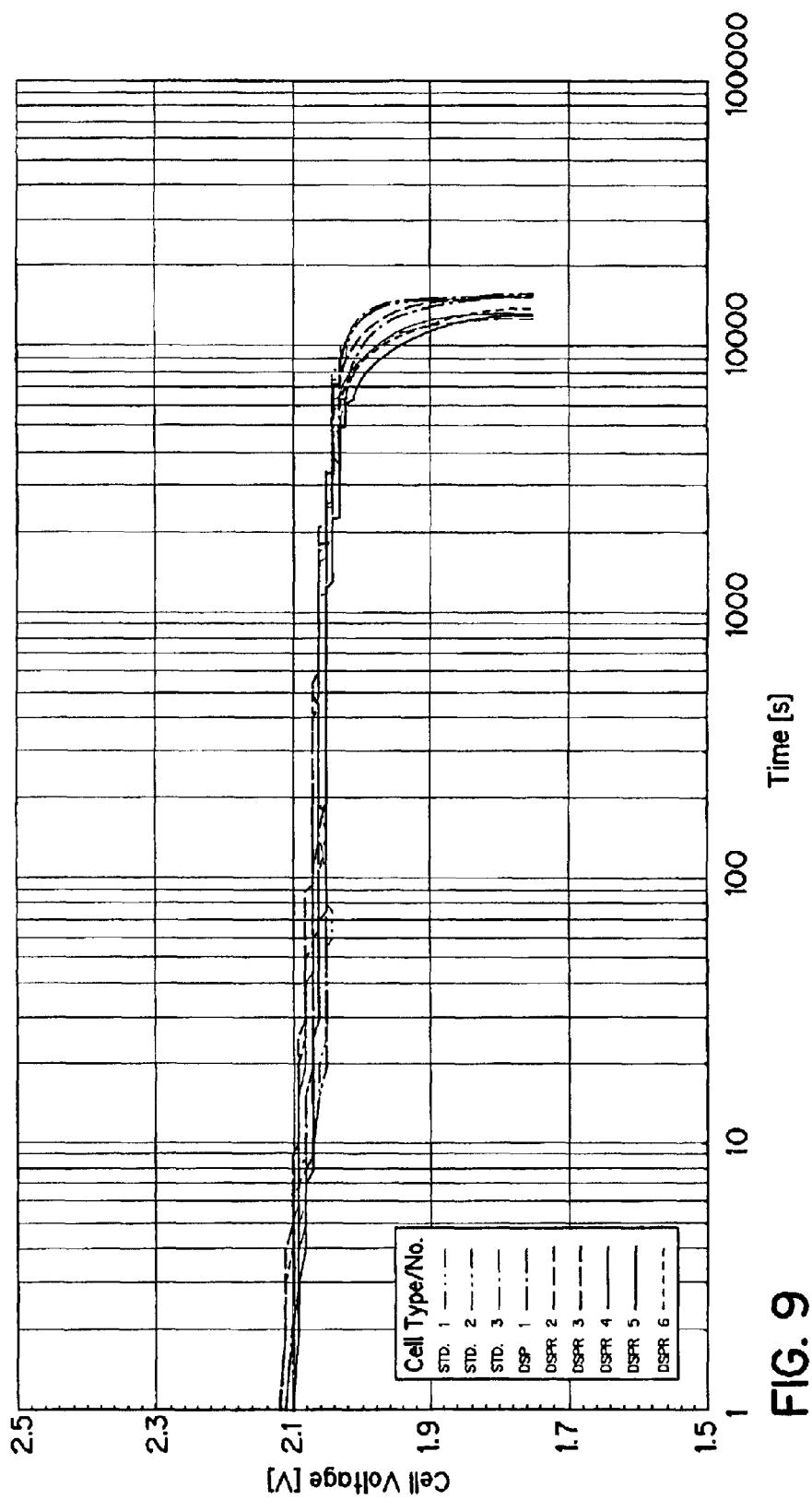
FIGS. 9–13 are graphical representations (cell voltage versus time) of the RC and CCA values provided in Table 3 below.
Figure 10:
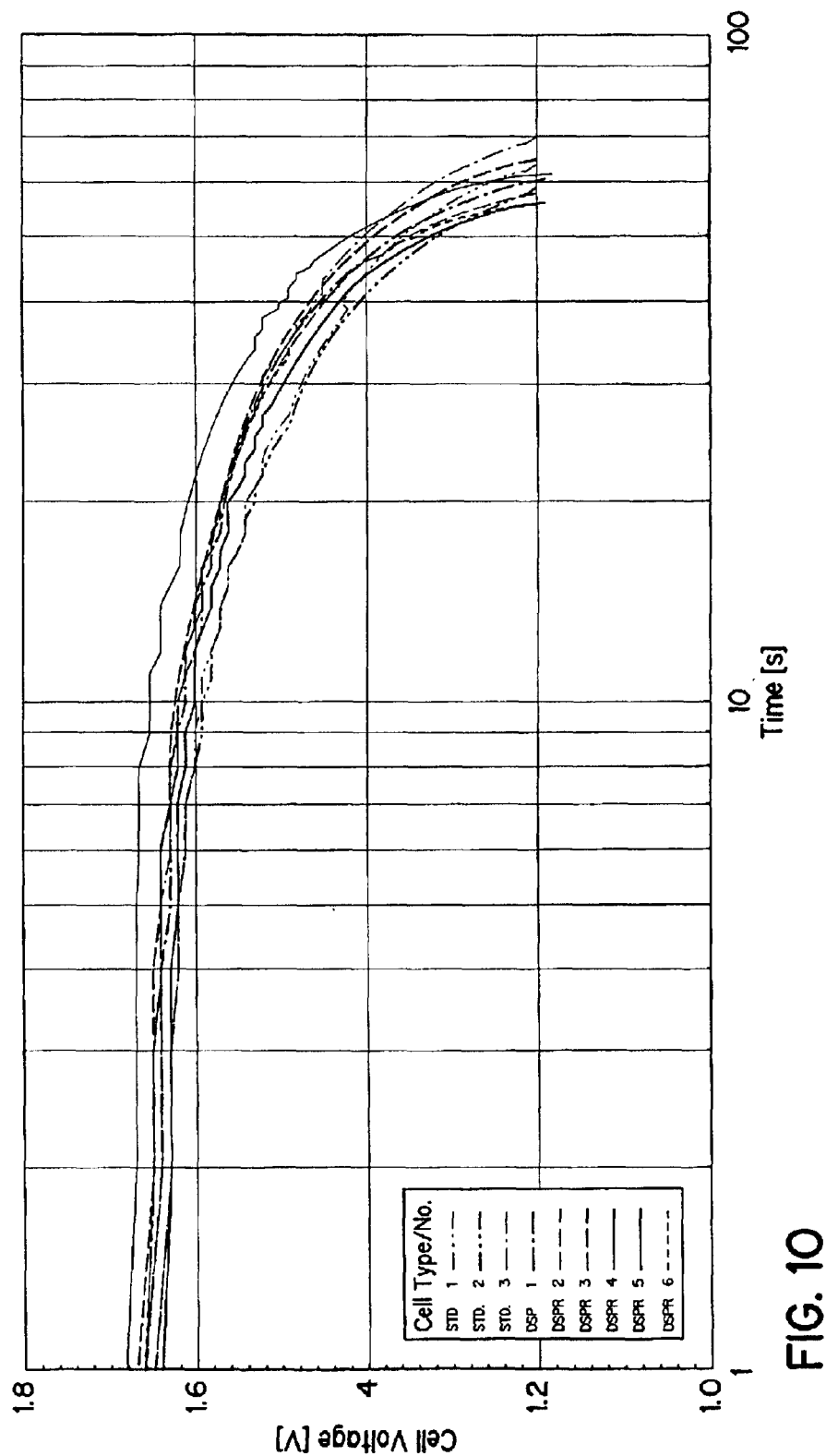
Figure 11:
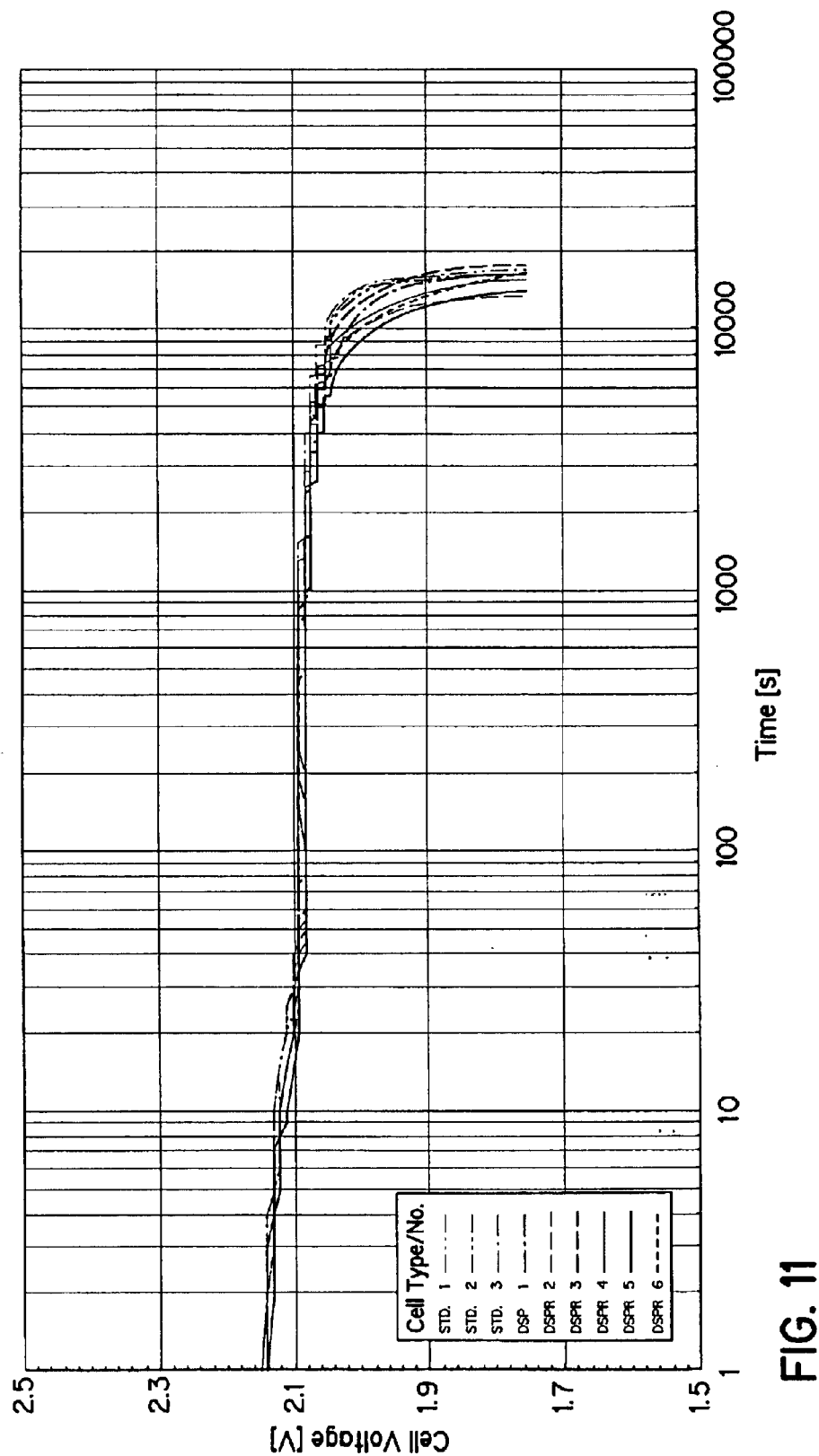
Figure 12:
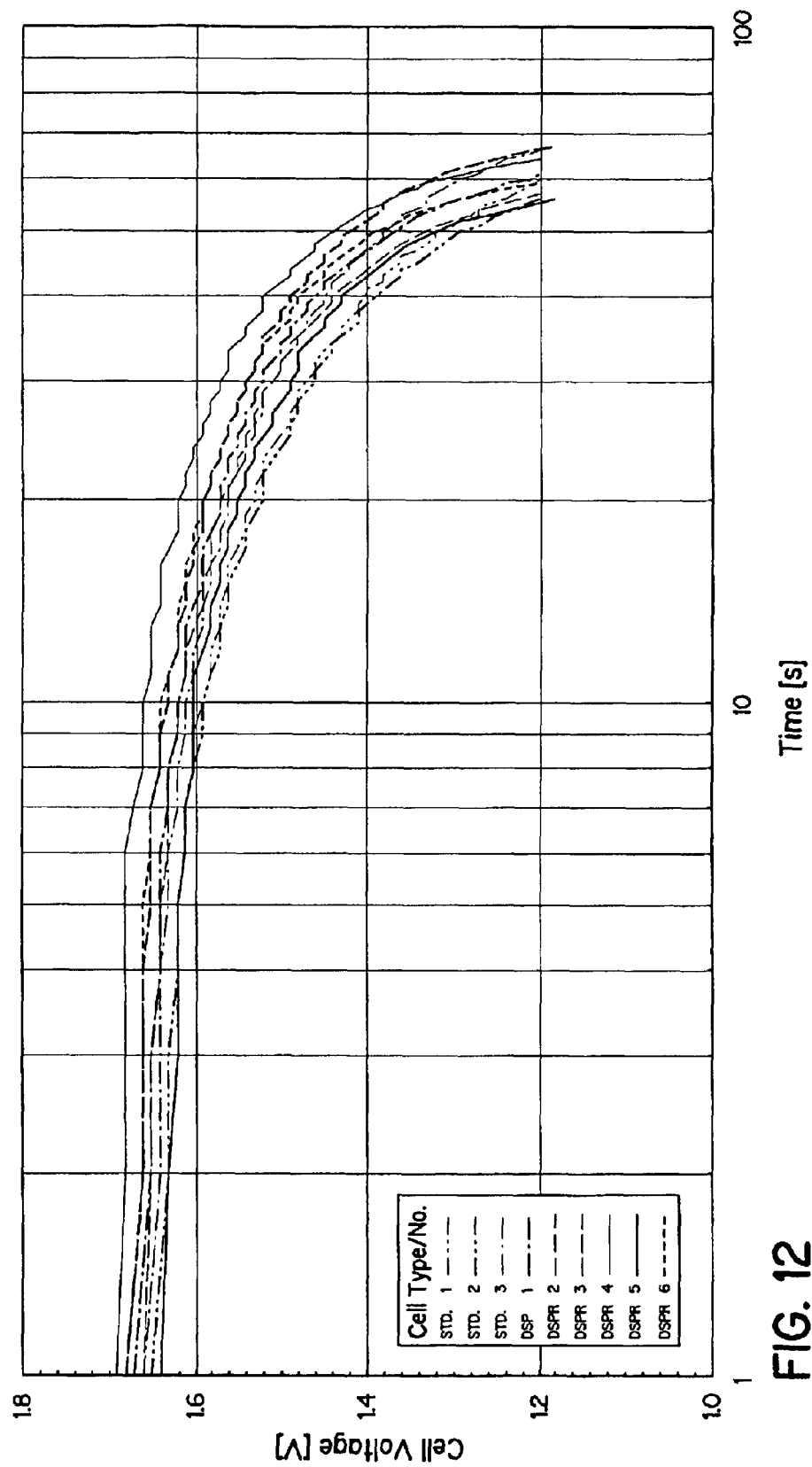
Figure 13:
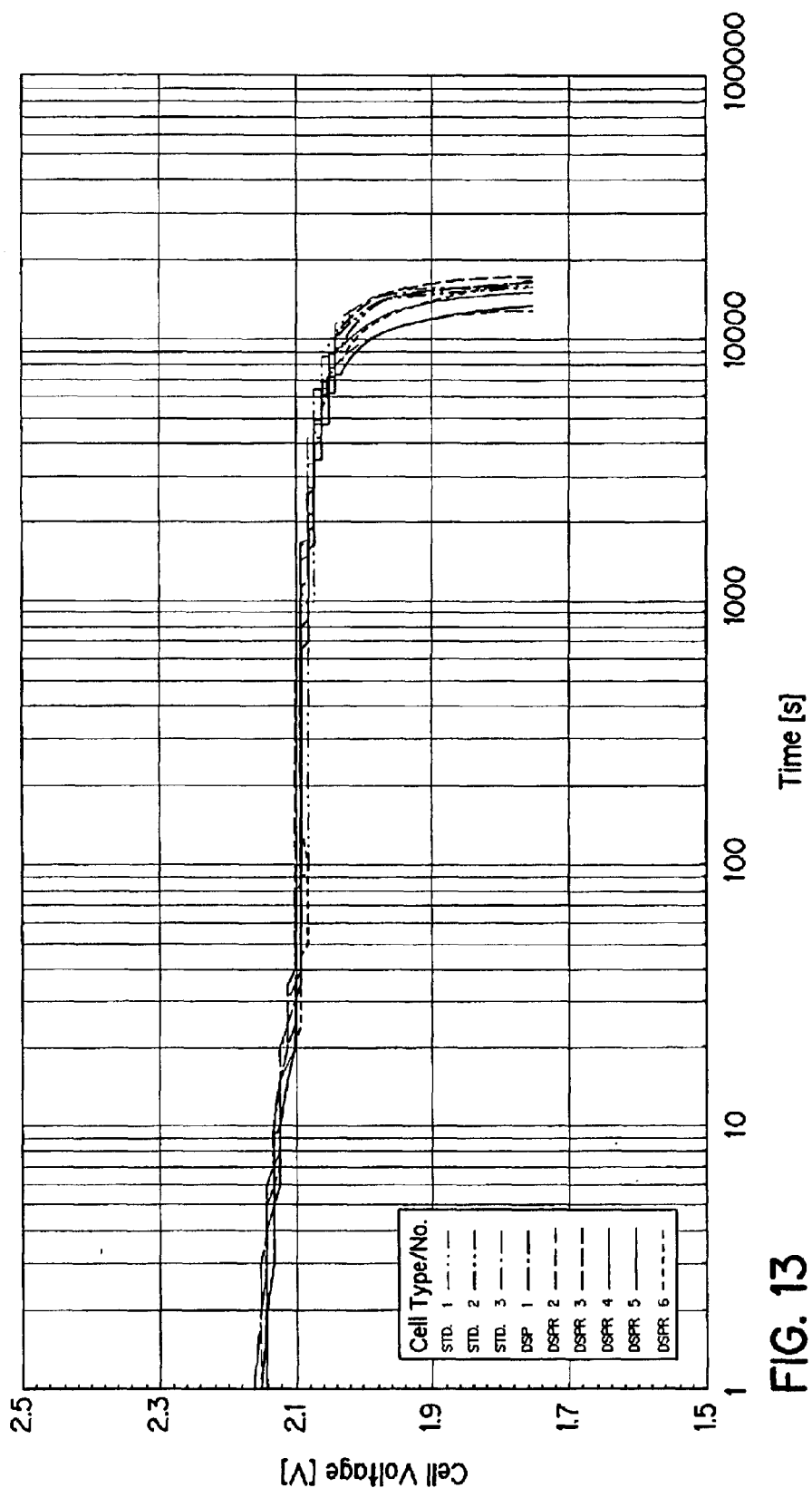

FIGS. 7A–7D are SEM photographs (at 7×, 25×, 50× and 500×, respectively) of an expanded metal grid of the prior art taken from an area as indicated by the circled area 7 of FIG. 6. As the magnification is increased, the SEM micrographs clearly reveal a microstructure that is highly fibrous, and which was subjected to extensive cold working by rolling. FIG. 7A further shows the large amount of open space in the expanded grid. In contrast, FIGS. 8A–8B are SEM micrographs of a grid of the present invention which has been work hardened on both sides, including perforations within the indentations and protrusions. FIG. 8A is a micrograph at about 20× magnification of a first side of a perforated grid, and FIG. 8B is of the second side of the same perforated grid. On each side, an alternating pattern of protrusions and indentations is visible, with the light areas representing indentations, and the dark areas indicating protrusions, and the black areas indicating the perforations. In the particular pattern shown, the indentations form a square pattern with the indentations spaced about 0.084 inches apart, as measured from the center of the indentation. The same size square is formed by the pattern of the protrusions. FIGS. 8C and 8D are micrographs at about 40× magnification of an individual indentation and protrusion, respectively, further detailing the perforation formed within the indentations and perforations. The approximate size of the square indentation is about 0.03 inch. The grain structure visible in FIGS. 8A–8D shows a cast grain structure rather than the cold rolled structure depicted in the prior art micrographs of FIGS. 7A–7D. Also, there are very little open areas in the grid structure. The only open areas are provided by the perforations.

The BCI (Battery Consortium International) test is a standardized procedure for testing batteries, and includes measurements of the reserve capacity (RC) and cold-cranking amperes (CCA). Normally, the BCI (CCA) tests are conducted at −18° C., but the test was modified, for convenience, to room temperature (about 75° F.). The RC values were measured at 2.08A normalized to 100 grams positive active material (PAM). The CCA results were obtained at 80A. The charging cycle for the BCI tests included charging the plates at 2.5 volts and less than 10 amps until the amps became less than 0.2 or the time greater than 12 hours, then the plates were rested for 30 minutes. The plates were then discharged at 2.08 amps until the voltage became less than 1.75, and then the plates were rested for 30 minutes. Three standard expanded grid samples (Std.) were tested for comparison to six double-sided embossed and perforated (DSP) samples pasted on both sides, with five of the samples rolled after pasting (DSPR) to provide uniformity for the paste, and to eliminate any sharp edges/corners. Average values were also provided for the DSP and DSPR samples and for the standard comparison samples. The results are provided in Table 3, and the comparison of the average values is further provided in Table 4. A comparison of the average values reveals that approximately the same results were achieved for the perforated samples of the present invention and the standard expanded grids of the prior art, but the perforated grids of the present invention had a thickness, including paste, of 0.04 inch, while the expanded grids had a thickness of 0.07 inch.

Thus, thinner plates may be used, thereby providing for additional plates to be included in the battery cell, by using the perforated grids of the present invention, while achieving similar results for reserve capacity and cold-cranking amperes. The results from Table 3 are further provided in graphical format in FIGS. 9–13. Each graph shows that the RC and CCA values vary little between samples of the present invention and standard expanded grid comparison samples.

TABLE 3

| RC Values @ 2.08 A Normalized to 100 g PAM | | | | | | | | | |
|---|---|---|---|---|---|---|---|---|---|
| Grid (+) g | Wt (−) g | PAM (g) | NAM (g) | Ratio PAM/NAM | RC1 (Ah) | RC2 (Ah) | RC3 (Ah) | Type | Spl # |
| 61.80 | 37.60 | 86.50 | 93.30 | 0.927 | 10.34 | 10.97 | 11.03 | DSP | 1 |
| 56.90 | 37.06 | 68.60 | 86.80 | 0.790 | 10.66 | 11.50 | 10.71 | DSPR | 2 |
| 56.80 | 37.60 | 89.10 | 93.90 | 0.949 | 10.19 | 11.49 | 11.27 | DSPR | 3 |
| 57.60 | 37.06 | 73.00 | 86.80 | 0.841 | 10.60 | 12.29 | 11.90 | DSPR | 4 |
| 59.30 | 37.60 | 78.30 | 86.30 | 0.907 | 9.67 | 10.57 | 9.94 | DSPR | 5 |
| 56.80 | 37.60 | 91.70 | 93.30 | 0.983 | 8.89 | 10.50 | 10.46 | DSPR | 6 |
| | | | | | 10.06 | 11.22 | 10.88 | Average Values | |
| 55.30 | 37.60 | 85.80 | 88.00 | 0.975 | 10.70 | 11.31 | 10.83 | Std. | 1 |
| 55.30 | 37.60 | 85.80 | 88.90 | 0.965 | 10.66 | 11.07 | 10.50 | Std. | 2 |
| 55.30 | 37.60 | 85.60 | 88.00 | 0.973 | 10.43 | 11.14 | 10.60 | Std. | 3 |
| | | | | | 10.60 | 11.17 | 10.64 | Average Values | |

| CCA1 @ 80 A | | | | | | CCA2 @ 80 A | | | | | |
|---|---|---|---|---|---|---|---|---|---|---|---|
| Voltage at | | | | (s) to | | Voltage at | | | | (s) to | |
| 0 s | 1 s | 5 s | 30 s | 1.2 V | (Ah) | 0 s | 1 s | 2 s | 30 s | 1.2 V | (Ah) |
| 2.19 | 1.66 | 1.63 | 1.52 | 61 | 1.36 | 2.20 | 1.67 | 1.64 | 1.52 | 61 | 1.36 |
| 2.19 | 1.66 | 1.64 | 1.52 | 58 | 1.29 | 2.20 | 1.66 | 1.64 | 1.51 | 57 | 1.27 |
| 2.18 | 1.67 | 1.64 | 1.52 | 65 | 1.44 | 2.19 | 1.68 | 1.65 | 1.54 | 67 | 1.49 |
| 2.18 | 1.68 | 1.67 | 1.56 | 62 | 1.38 | 2.19 | 1.69 | 1.68 | 1.57 | 64 | 1.42 |
| 2.18 | 1.64 | 1.62 | 1.50 | 56 | 1.24 | 2.19 | 1.64 | 1.62 | 1.49 | 56 | 1.24 |
| 2.18 | 1.66 | 1.64 | 1.52 | 56 | 1.24 | 2.18 | 1.68 | 1.66 | 1.54 | 59 | 1.31 |
| 2.18 | 1.66 | 1.64 | 1.52 | 59.67 | 1.33 | 2.19 | 1.67 | 1.65 | 1.53 | 60.67 | 1.35 |
| 2.19 | 1.65 | 1.62 | 1.48 | 64 | 1.42 | 2.20 | 1.65 | 1.62 | 1.47 | 60 | 1.33 |
| 2.19 | 1.65 | 1.62 | 1.47 | 59 | 1.31 | 2.20 | 1.65 | 1.62 | 1.46 | 56 | 1.24 |
| 2.19 | 1.66 | 1.64 | 1.52 | 70 | 1.56 | 2.20 | 1.66 | 1.63 | 1.51 | 66 | 1.47 |
| 2.19 | 1.65 | 1.63 | 1.49 | 64.33 | 1.43 | 2.2 | 1.65 | 1.62 | 1.48 | 61 | 1.35 |

TABLE 4

| Comparison of Average Values | | | | | |
|---|---|---|---|---|---|
| Cell Type | RC1 | CCA1 | RC2 | CCA2 | RC3 |
| Standard Grids | 10.6 Ah | 64 s | 11.2 Ah | 61 s | 10.6 Ah |
| Thin Perforated Grids | 10.1 Ah | 60 s | 11.2 Ah | 61 s | 10.9 Ah |

Figure 14:
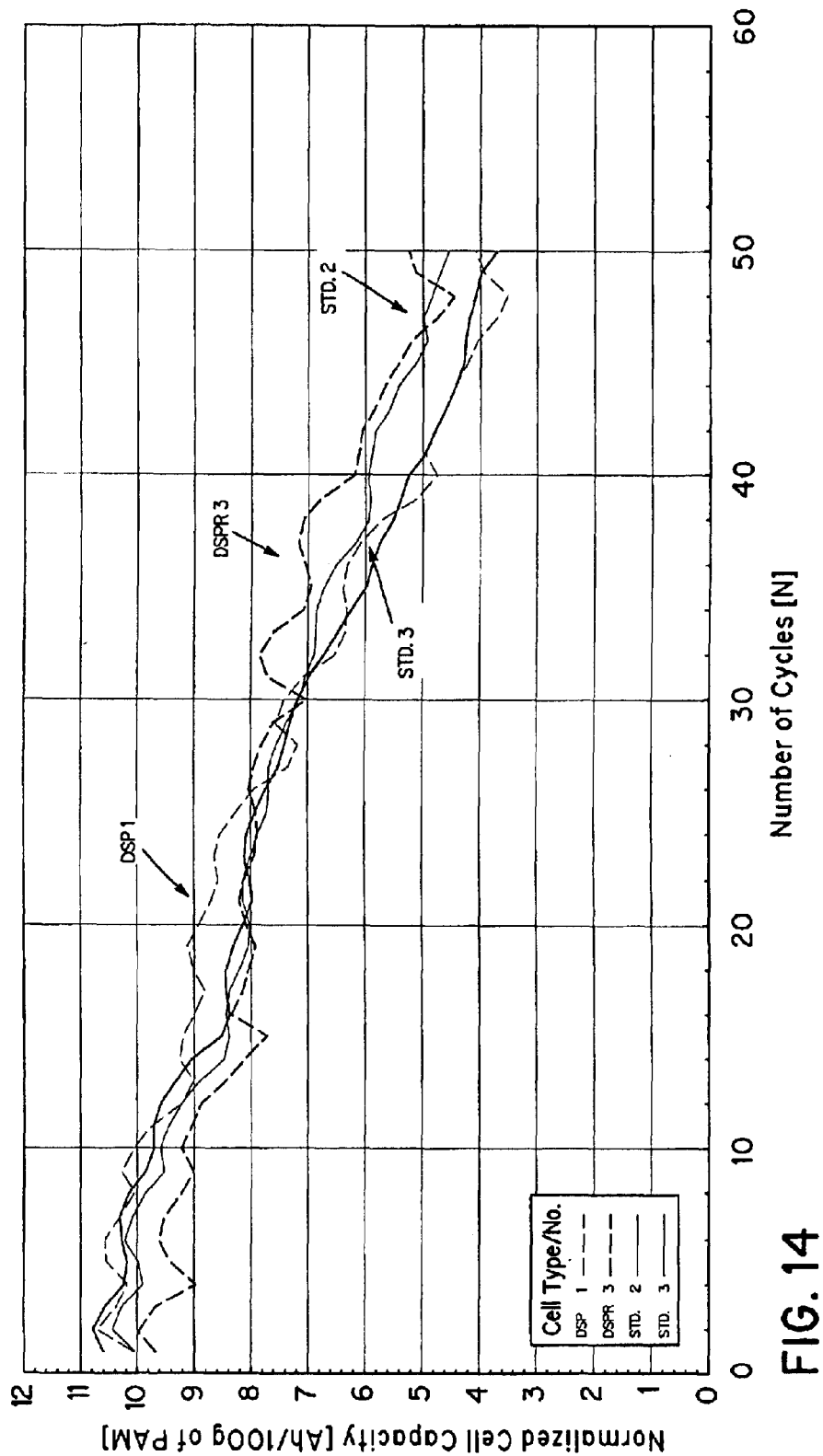
FIG. 14 is a graph of the results of a life test, depicting the loss of cell capacity over 50 cycles.

The perforated and standard expanded grids were also subjected to a life test, and the cycle life data is provided in graphical format in FIG. 14. The specific grids tested were Samples 1 and 3 of the perforated samples, and Samples 2 and 3 of the standard expanded grid samples. The plates were charged at 2.5 volts and less than 10 amps until the amps became less than 0.2 or the time greater than 12 hours, then the plates were rested for 10 minutes. The plates were then discharged at 5 amps until the voltage became less than 1.5, and then the plates were rested for 10 minutes. Again, the life cycle data indicates that both the expanded grids and the perforated grids of the present invention perform similarly, but the perforated grid of the present invention is significantly thinner than the expanded grid of the prior art, thus allowing for a greater number of plates in the cell assembly, and greater surface area for the paste interface.

While embossing has been described in detail in the exemplary embodiments, it may be understood that any work hardening technique may be employed that forms impressions in one or both of opposing surfaces of the cast strip, without removing material. For example, the cast strip may be knurled. In addition, direct casting has been described in detail for forming the thin strip, but it should be understood that other methods now known or hereafter developed for forming a thin lead alloy strip could be used, for example other casting methods than direct casting onto a drum.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method of making a lead alloy grid for use in a plate of a lead acid battery, comprising the steps of:
   forming a strip of a lead-tin-calcium alloy; and
   forming a plurality of indentations in a surface of the strip, wherein the alloy is formed to a thickness in the range of about 0.005–0.015 inch.

2. The method of claim 1 wherein the alloy is Pb-1.5Sn-0.08Ca.

3. The method of claim 1 wherein forming the strip includes direct casting the alloy.

4. The method of claim 3 wherein the alloy is direct cast to a thickness in the range of about 0.005–0.015 inch.

5. The method of claim 1 further comprising forming perforations within the indentations.

6. The method of claim 1 wherein the plurality of indentations are formed in each of the opposing surfaces of the strip.

7. The method of claim 1 further comprising, prior to forming the indentations, rolling the strip to reduce its thickness.

8. The method of claim 7 wherein the rolling reduces the strip to a thickness in the range of about 0.005–0.015 inch.

9. The method of claim 1 wherein forming the indentations includes embossing the surface to form pyramid-shaped indentations each having a central indented area surrounded by four angled surfaces.

10. The method of claim 9 wherein the embossing further includes splitting the strip in the central indented areas to form perforated indentations.

11. The method of claim 1 wherein the work hardening includes embossing the surface to form diamond-shaped indentations each having a central indented point surrounded by four angled surfaces.

12. The method of claim 11 wherein the embossing further includes splitting the strip at the central indented points to form perforated indentations.

13. The method of claim 1 wherein work hardening includes embossing the surface to form hemispherical-shaped indentations.

14. The method of claim 1 wherein work hardening includes knurling the surface.

15. A method of making a plate for a lead acid battery comprising the steps of applying an active mass paste to a lead alloy grid formed by the method of claim 1 to form a pasted grid, then steaming the pasted grid, and curing the pasted grid.

16. A method of making a plate for a lead acid battery comprising the steps of applying an active mass paste to a lead alloy grid formed by the method of claim 4 to form a pasted grid, then steaming the pasted grid, and curing the pasted grid, wherein the cured pasted grid has a thickness of about 0.05 inch or less.

17. A method of making a lead alloy grid for use in a plate of a lead acid battery, comprising the steps of:
   direct casting a strip of a lead-tin-calcium alloy onto a drum to form a cast strip of thickness in the range of about 0.005–0.015 inch; and
   embossing opposing surfaces of the cast strip to form a pattern on each surface of protrusions and indentations.

18. The method of claim 17 wherein the alloy is Pb-1.5Sn-0.08Ca.

19. The method of claim 17 wherein the embossing further includes splitting the strip at a high point of the protrusions and indentations.

20. The method of claim 17 wherein the embossing forms pyramid-shaped protrusions and indentations each having a central area surrounded by four angled surfaces.

21. The method of claim 20 wherein the embossing further includes splitting the strip in the central areas to form perforated protrusions and indentations.

22. The method of claim 17 wherein the embossing forms cone-shaped protrusions and indentations each having a central point surrounded by an angled surface.

23. The method of claim 22 wherein the embossing further includes splitting the strip at the central points to form perforated protrusions and indentations.

24. The method of claim 17 wherein the embossing forms hemispherical-shaped protrusions and indentations.

25. A method of making a plate for a lead acid battery comprising the steps of applying an active mass paste to a lead alloy grid formed by the method of claim 17 to form a pasted grid, then steaming the pasted grid, and curing the pasted grid, wherein the cured pasted grid has a thickness of about 0.05 inch or less.

26. A method of making a plate for a lead acid battery comprising the steps of applying an active mass paste to a lead alloy grid formed by the method of claim 19 to form a pasted grid, then steaming the pasted grid, and curing the pasted grid, wherein the cured pasted grid has a thickness of about 0.05 inch or less.

27. A lead alloy grid for use in a plate of a lead acid battery, the grid comprising a cast lead-tin-calcium alloy having on each of opposing surfaces a pattern of space protrusions and indentations, wherein the grid between the spaced protrusions and indentations has a thickness of about 0.005–0.015 inch.

28. The grid of claim 27 wherein the protrusions and indentations are evenly spaced apart at a distance of about 0.01–0.03 inch.

29. The grid of claim 27 wherein the alloy is Pb-1.5Sn-0.08Ca.

30. The grid of claim 27 further including a perforation at a high point of each of the protrusions and indentations.

31. The grid of claim 27 wherein the protrusions and indentations are pyramid-shaped, each having a central area surrounded by four angled surfaces.

32. The grid of claim 31 further including a perforation in each central area.

33. The grid of claim 27 wherein the protrusions and indentations are diamond-shaped, each having a central point surrounded by four angled surfaces.

34. The grid of claim 33 further including a perforation at each central point.

35. The grid of claim 27 wherein the protrusions and indentations are hemispherical-shaped.

36. A plate for a lead acid battery comprising a cured active mass on the lead alloy grid of claim 27, wherein the plate has a thickness of about 0.05 inch or less.

37. A plate for a lead acid battery comprising a cured active mass on the lead alloy grid of claim 27, wherein the plate has a thickness of about 0.005 inch or less.

* * * * *